United States Patent [19]

Busby

[11] Patent Number: 4,466,023

[45] Date of Patent: Aug. 14, 1984

[54] VIDEO DISK PLAYER SIMULATOR, METHOD AND APPARATUS

[75] Inventor: Bruce E. Busby, Mountain View, Calif.

[73] Assignee: Sony Corporation, Japan

[21] Appl. No.: 341,350

[22] Filed: Jan. 21, 1982

[51] Int. Cl.³ .................. G11B 5/00; G11B 31/00; H04N 5/782
[52] U.S. Cl. .................................. 360/55; 360/71; 360/137; 358/342
[58] Field of Search ............... 360/55, 71, 72.1, 72.2, 360/137; 358/310, 322, 335, 342

[56] References Cited

U.S. PATENT DOCUMENTS 4,009,331  2/1977  Goldmark et al. ............ 358/335 X
4,305,131  12/1981  Best ............................. 358/342 X

OTHER PUBLICATIONS

Operating Instructions for the Sony Video Responder VRS-110ES, et al.

Primary Examiner—Robert L. Richardson
Attorney, Agent, or Firm—Limbach, Limbach & Sutton

[57] ABSTRACT

A system and method for simulating the operation of a video disk player playing an interactive video disk, which comprises a video tape player, a timing code reader, a monitor, a computer, and an input device. A control program is entered into the computer through the input device. A video tape is loaded in the video tape player. The video tape player generates video signals and a timing code signal associated therewith. The video signals are displayed on the monitor. The timing code signal is converted into an output signal by the timing code reader. The computer, under operator control, controls the operation of the video tape player, in response to the output signal and the control program such that the video signals displayed on the monitor simulate the operation of a video disk player playing an interactive video disk.

9 Claims, 4 Drawing Figures

VIDEO DISK PLAYER SIMULATOR, METHOD AND APPARATUS

BACKGROUND OF THE INVENTION

This application includes a microfiche appendix containing two fiches, copyright 1981 Sony Corporation, with a total of one hundred eighteen (118) frames.

The present invention relates to an apparatus which simulates the operation of a video disk player and, more particularly, to the simulation of an interactive type of video disk player, playing a video disk having video and control information encoded in the disk. The present invention also relates to a method of simulating a video disk player.

Video disk players (VDP) are well-known in the art. Heretofore, VDP's can play video disks of two types. In one type of video disk, video and audio signals only are recorded on the disk. The VDP simply plays back the signals encoded therein in a sequentially fixed format. An example of the type of programming material which is recorded in this type of video disk is feature-length movies.

Another type of video disk is the interactive type. In this type, video and audio signals, along with control signals, are all encoded in the disk. The control signals receive feedback from the user of the VDP and, depending on the feedback received, can alter the operation or the playing of the video disk. The format of the presentation of the programming material can be altered depending on the response from the user. One example of this type of interactive video disk is in the educational area. Depending on the correctness or the frequency of correction the student has responded to a set of programming material, the VDP can repeat sections of the program, or perhaps even skip on to more advanced sections of the programming material.

Video disks, of either of the fixed format type or of the interactive type, are manufactured much the same way as audio disks are manufactured. First, the programming material is recorded on a master magnetic tape. In the case of video disks, the programming material is recorded on a video tape by a video tape recorder/reproducer. The information is then transferred from the tape medium to produce a master record. In the case of an interactive video disk, the video and audio program, as recorded on the video tape, must be integrated with the control program, to produce a master disk. Each disk is then stamped out from the master disk.

For interactive video disks, there are two potential sources of error in the production of the master disk. First, the control program itself may contain errors. For example, if a student has done exceedingly well, and should proceed to an advanced section of the programming material, the control program, might instead, instruct the VDP to repeat the same section of the programming material.

A second source of error is in the integration of the control program with the video and audio program. In this case, the control program is correct but the programming material is not in the correct sequence. The student or user will see a correct advancement to an incorrect portion of the programming material.

Heretofore, the accuracy of the control program and the accuracy of the integration of the programming material with the control program are checked only after a master disk is produced. In the event there is an error in the master disk, the master disk must be discarded. Because a major portion of the cost involved in the making of a video disk is the manufacture of the master disk, this has resulted in waste.

SUMMARY OF THE INVENTION

Therefore, in accordance with the present invention, there is provided a method and a system for simulating the operation of a video disk player playing a disk of an interactive type which has video and control information encoded in the disk. The system comprises a video tape player means for producing video signals having a timing code signal associated therewith. The video signals are displayed on a monitor. A timing code signal reading means receives the timing code signals and produces an output signal. Computer means receives the control information and the output signal from the timing code reading means and controls the operation of the video tape player in response thereto, such that the video signals displayed simulates the operation of a video disk player playing a disk of an interactive type. Said computer means is also capable of amending the control information.

DETAILED DESCRIPTION OF THE DRAWING

Figure 1:
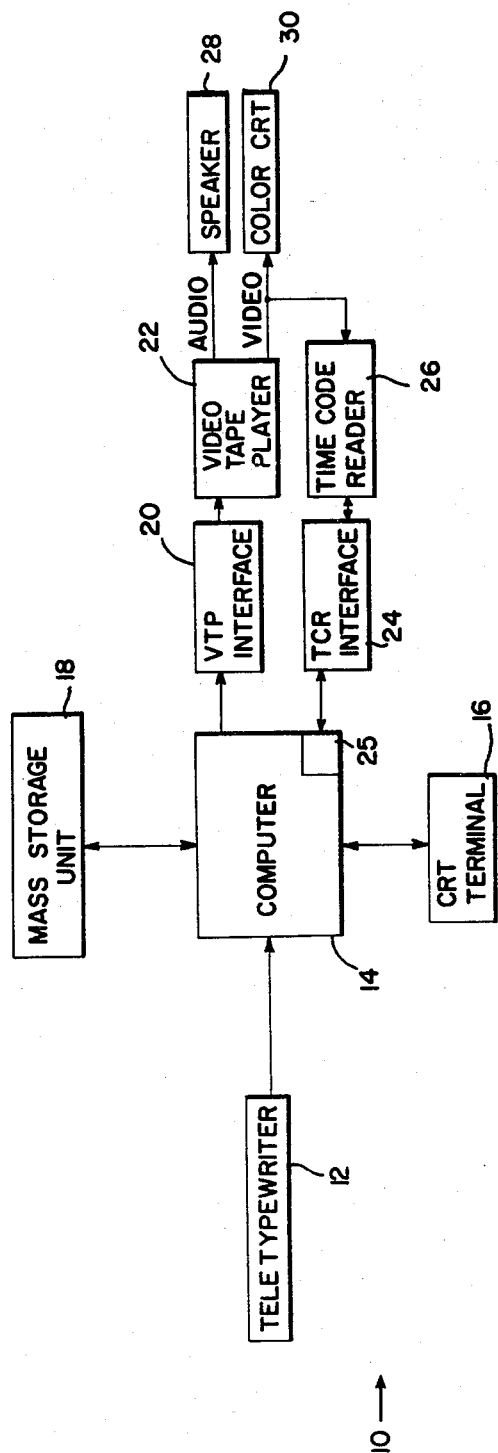
FIG. 1 is a schematic, in block diagram form, of the system of the present invention.

Referring to FIG. 1, there is shown a system 10 of the present invention. The system 10 comprises a teletypewriter 12 connected to a computer 14. The teletypewriter 12 serves as the input device for the control program to be entered into the computer 14. The control program comprises a plurality of instructions. Also connected to the computer 14 is a CRT terminal 16 which can act as the operator's console for access to the computer 14. A mass storage unit 18 is also connected to the computer 14. From the computer 14, signals are sent by the computer 14 via a Video Tape Player (VTP) interface 20 to a video tape player 22. The video tape player 22 reproduces video and audio signals recorded on a magnetic video tape. The audio signals are supplied to a speaker 28, while the video signals are supplied to a color CRT monitor 30. The video tape player 22 is chosen such that the video signals produced therefrom have timing code signals associated with the video signals. The timing code can take the form of a longitudinal timing code (LTC) or a vertical interval timing code (VITC). These timing codes are well known in the industry. The LTC or VITC is entered into a timing code reader 26. The timing code reader 26 converts the LTC or VITC into an output signal, representative of a count of the number of picture frames incorporated in the video program from a pre-determined point, such as the beginning of the video tape. The output signal is sent to the computer 14, via a Timing Code Reader interface 24.

In the operation of the system 10 of the present invention, the simulation program is loaded from the mass storage unit 18 into the memory of the computer 14. A copy of the program is set forth in the microfiche appendix. A duplicate of the master tape containing the video and audio information of the desired programming material which is to be integrated with the control program is loaded onto the video tape player 22. The control program for the operation of video disk is either entered from the teletypewriter 12 by way of paper tape, or is entered manually from the CRT terminal 16 and is converted to a set of control signals. The computer 14 then receives commands from the CRT terminal 16. One of the commands which can be entered into the computer 14 from the keyboard of the CRT terminal 16 is "RUN" the control program, thereby causing the system 10 to simulate the operation of a video disk player playing a disk of an interactive type. Other commands which can be entered into the computer 14 from the keyboard of the CRT terminal 16 include various commands to detect errors in the control program and to modify the control program. In the event the command to run the control program is entered into the computer 14, the computer 14 receives the control signals from the teletypewriter 12 and in response thereto and in response to the output signal from the timing code reader 26 operates the video tape player 22 in playing the video tape thereon.

Figure 2:
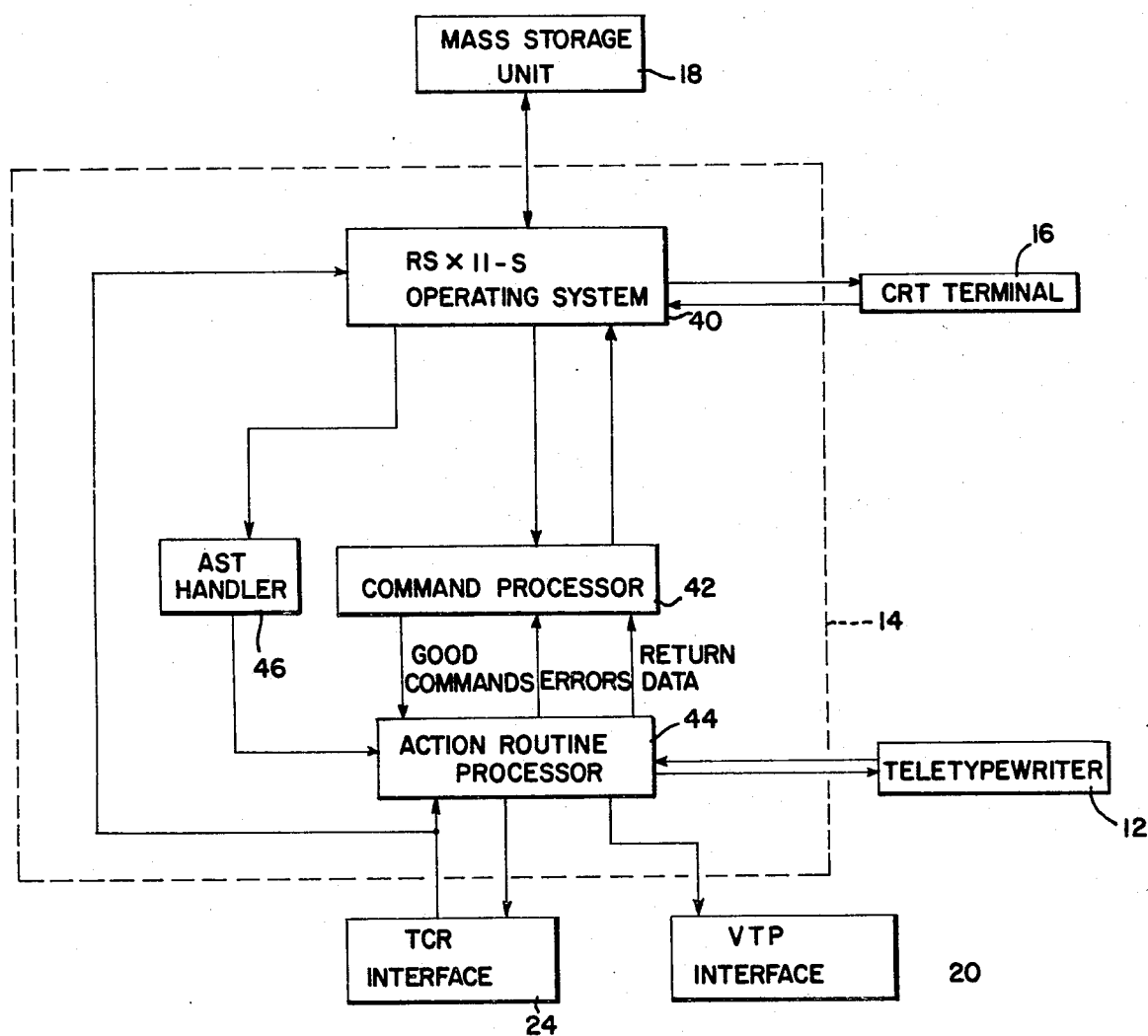
FIG. 2 is a block diagram of the software in the computer of the present invention.
Figure 3:
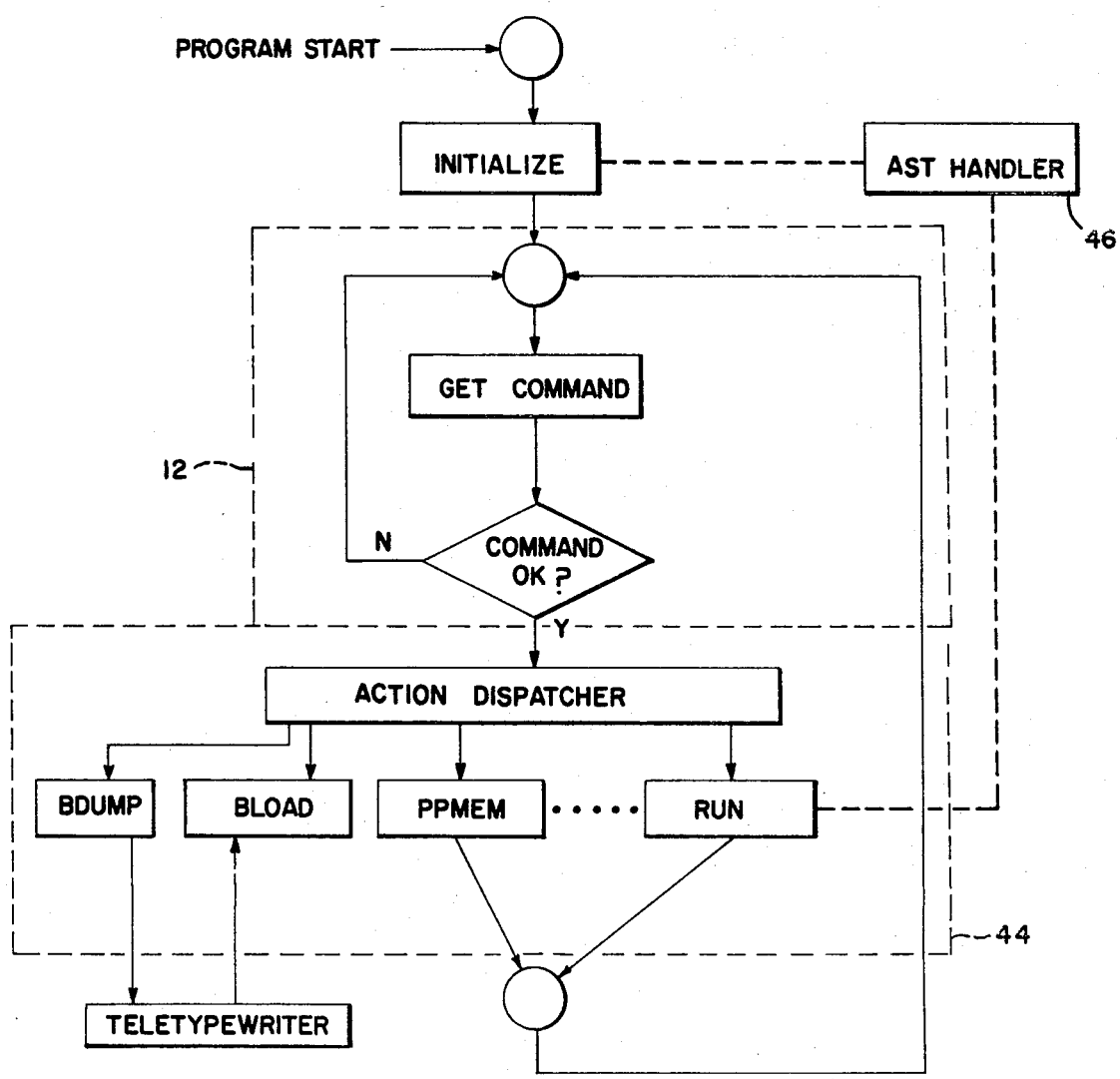
FIG. 3 is a flow chart of a portion of the software shown in FIG. 2.

The operation of the simulation program can be understood by referring to FIGS. 2 and 3. As shown in FIG. 2, the software contained within the computer 14 is comprised of the following blocks: the operating system 40, the command processor 42, the action routine processor 44 and the AST handler 46. The operating system 40 is the software provided by the manufacturer of the computer 14. The operating system 40 communicates with the mass storage unit 18 and the CRT terminal 16. The operating system 40 determines the protocol of the commands entered from the CRT terminal 16. In the event the command which is entered from the CRT terminal 16 satisfies the protocol, the command is then passed on to the command processor 42.

The command processor 42 determines only if the command entered from the CRT terminal 16 is a valid command, i.e. a command with correct syntax. In the event the command is an invalid command, the command processor 42 gets another command. In the event the command is a valid command, the command processor 42 sends the command to the Action Dispatcher of the Action Routine 44 for further processing. The action of the command processor 42 is like that of a compiler in a computer in that the processor 42 analyzes only the syntax of the command. An example of an invalid command is "PPMEM" (Patch Program Memory) without specifying the location or the numbered instruction in the control program, which is to be modified. For the command PPMEM, it must always be followed by a number in order to be a valid command.

The Action Routine 44 receives the valid command from the processor 42 and selects the appropriate routine to operate on that command. For example, if the command is "PPMEM 1000" the Action Routine 44 selects the PPMEM routine to execute that command. The Action Routine 44 also selects other routines to execute other types of commands, such as List Program Memory, or RUN. While the command processor 42 checks only the syntax of the command, the Action Routine 44, in executing the various commands, checks the semantics of the commands. For example, "PPMEM 1000" is a syntactically valid command. However, 1000 is beyond the limit of the total number of instructions. The "PPMEM" action routine 44, when it tries to execute this command, will find that instruction #1000 does not exist. If will then display an error message on the video screen of the CRT terminal 16.

An Asynchronous System Trap (AST) Handler 46 is also provided in the software of the computer 14. Because it is possible for the VTP 22 to be caught in an endless loop during the execution of certain routines, such as RUN, SEARCH and STEP, the AST Handler 46 provides the user with an override to cancel the command that is being executed.

To operate the system 10 of the present invention, the simulation program is loaded from the mass storage unit 18, the master tape is loaded onto the video tape player 22 and the control program is loaded onto the teletypewriter 12. The operator then enters the command "BLOAD" on the keyboard of the CRT terminal 16, loading the control program from the teletypewriter 12 into the memory of the computer 14. When the command "RUN" is entered from the CRT terminal 16, each instruction of the control program is then directly processed by the "RUN" action routine 44.

ERROR DETECTION

There are a number of techniques to detect errors in the control program or in the integration of the control program with the programming material. Listed herein below are a few of the techniques to detect such errors.

1. The most obvious way of detecting error is by the operator seeing the video images on the color CRT 30 and hearing the audio sounds from the speaker 28. Any error in the correspondence between the video image and the control program will result in the display of an incorrect video image on the color CRT 30. This, of course, can be readily discerned by the operator.

2. As previously stated, when the system 10 is in the "RUN" Action Routine mode, the RUN action routine 44 checks the semantics of each instruction of the control program. If there is an error in an instruction of the control program, the RUN action routine 44, in attempting to execute it, would cause an error. This is then displayed on the video screen of the CRT terminal 16. In the RUN mode, the computer 14 executes each instruction of the control program based upon the output signal from the timing code reader 26. For example, if the instruction is "play segment 1" and segment 1 is initialized to start at frame 10 and end at frame 20, and based upon the output signal from the timing code reader 26, the video tape is not at frame 10, then the video tape player 22 is first either advanced forward or reversed to frame 10. However, if there is an error in the semantics of the instruction, e.g., "play segment 1" and no starting frame or ending frame is provided for segment 1, then when the RUN action routines 44 tries to execute the instruction, it will halt and display an error message on the video screen of the CRT terminal 16.

3. The operator can also enter the command "TRACE" through the CRT terminal 16. In this mode, the system 10 executes the control program in the RUN mode except the execution is done step-by-step. TRACE action routine is a part of RUN action routine.

ERROR TRACING

Although an error can be detected by any one of the above-identified techniques, the precise location of the error may not be known. Thus, the operator must locate precisely the error before correcting it. To assist the operator in precisely locating the error, the following techniques are available:

1. As previously stated, the command "TRACE" causes the system 10 to RUN the control program on a step-by-step basis.

2. The entering of the command "IHIST" (DISPLAY INSTRUCTION HISTORY) on the CRT terminal 16 causes up to thirty-two (32) instructions of the control program that were executed before the halt to be displayed on the video screen. Thus, the operator will see all the instructions that were executed that led up to the halt.

3. The entering of the command "LPMEM" (LIST PROGRAM MEMORY) disassembles the control program or a subset thereof and lists the instructions of the control program or that subset which is in memory.

4. The entering of the command "DSMEM" (DISPLAY SEGMENT MEMORY) causes all or some of the segments with their starting frame and ending frame to be displayed.

5. Within the simulation program is also a BREAKPT routine, which halts the processing of the instruction of the control program if the same instruction is being executed repetitively. This can prevent the system 10 from being caught in an endless loop. An example of an instruction which would precipitate the BREAKPT routine halting the execution is:

LABEL: GOTO LABEL

ERROR CORRECTION

Once the error has been pinpointed, it can be corrected by the entry of a new instruction on the CRT terminal 16 to replace the incorrect instruction in the memory of the computer 14.

1. The command "PPMEM" (or Patch Program Memory) followed by the instruction number will cause the PPMEM action routine 44 to display the numbered instruction on the video screen of the CRT terminal 16 for optional correction by the operator. The operator can then decide whether or not to correct the instruction. In the event a new instruction is entered on the CRT terminal 16, it would replace the numbered instruction, which was displayed.

2. The command "PSMEM" (or Patch Segment Memory) followed by the segment number will cause the PSMEM action routine 44 to display the numbered segment in the video screen of the CRT terminal 16 for optional correction by the operator.

Once all the corrections have been entered, the operator can enter the command "BDUMP" which causes the corrected control program within the memory of the computer 14 to be transmitted to the teletypewriter 12 causing the creation of a paper tape with the correct control program.

The teletypewriter 12 simply inputs the control program and converts it into control signals for the computer 14. The control program can be in any form or medium, including paper tape. The computer 14 comprises a DEC LSI-11/2 computer, with 32 kilowords of memory; however, any type of computer can be used. The CRT terminal 16 is an ADM3A. Once again, any form of CRT terminal can be used. The mass storage unit 18 comprises a TU-58 cartridge tape. The sole function of the mass storage unit 18 is to store the software program which is used by the computer 14. Once the software program is loaded from the mass storage unit 18 onto the computer 14, the mass storage unit 18 is no longer used. Of course, any mass storage unit device can be used. The computer 14 communicates with the video tape player 22 via a VTP interface 20. This interface 20 translates the 8-bit computer format to either parallel or serial type format, which is suitable for the VTP remote control. The type of format is determined by the type of video tape player 22 selected. In the event the VTP 22 is a BVU-200, the VTP interface 22 is a BK-1002 BVU interface card. Both the above VTP interface 20 and the video tape player 22 are commercially available and are marketed by Sony Corporation. The video tape player 22 should be able to simulate certain operations of a video disk in that the VTP 22 must be capable of stop-frame display, play, slow play, fast play and perform other display and search functions.

The LTC and VITC signals that are associated with the video signals are entered into a time code reader 26. With the selection of the video tape player 22 as a BVU-200, the time code reader 26 is a BVG-1000. This unit is also commercially available from Sony Corporation. The time code reader 26 receives the LTC and VITC signals, which are representative of the actual amount of time that has been played by the tape on the video tape player 22, and converts the signals into a signal which is indicative of the number of picture frames from a predetermined starting point, such as the beginning of the tape. This conversion is necessary, because in video disk player systems, the video disk outputs the number of the frame to the video disk player and the control program controls the VDP based on the number of the frame. Therefore, in order for the control program to interact properly with a simulated video disk player, the simulated video disk player must provide a signal representative of the number of picture frames from a predetermined starting point.

The timing code reader 26, i.e., the BVG-1000 unit, automatically selects the LTC or the VITC data depending on whichever presents the best data. In addition, the Timing Code Reader 26 automatically converts the LTC or VIC data into four parallel bits of timing code, followed by four parallel bits of user bits. The former contain timing information while the latter can be programmed by the user. These standards are set by the Society of Motion Picture and Television Engineers (SMPTE) and are well known in the art. Thus, the data from the timing code reader 26 is in a stream of four parallel bits of timing signal interleaved with four parallel bits of user's bits.

The function of the TCR interface 24 is to reformat the data from the timing code reader 26 into an eight parallel bit stream for connection to a DRV-11, which is an interface 25 to the DEC LSI-11 computer 14. The DRV-11 is an interface commercially available from Digital Equipment Corporation (DEC). Physically, it can be located in the same mechanical housing which holds the DEC LSI-11 computer 14.

Figure 4:
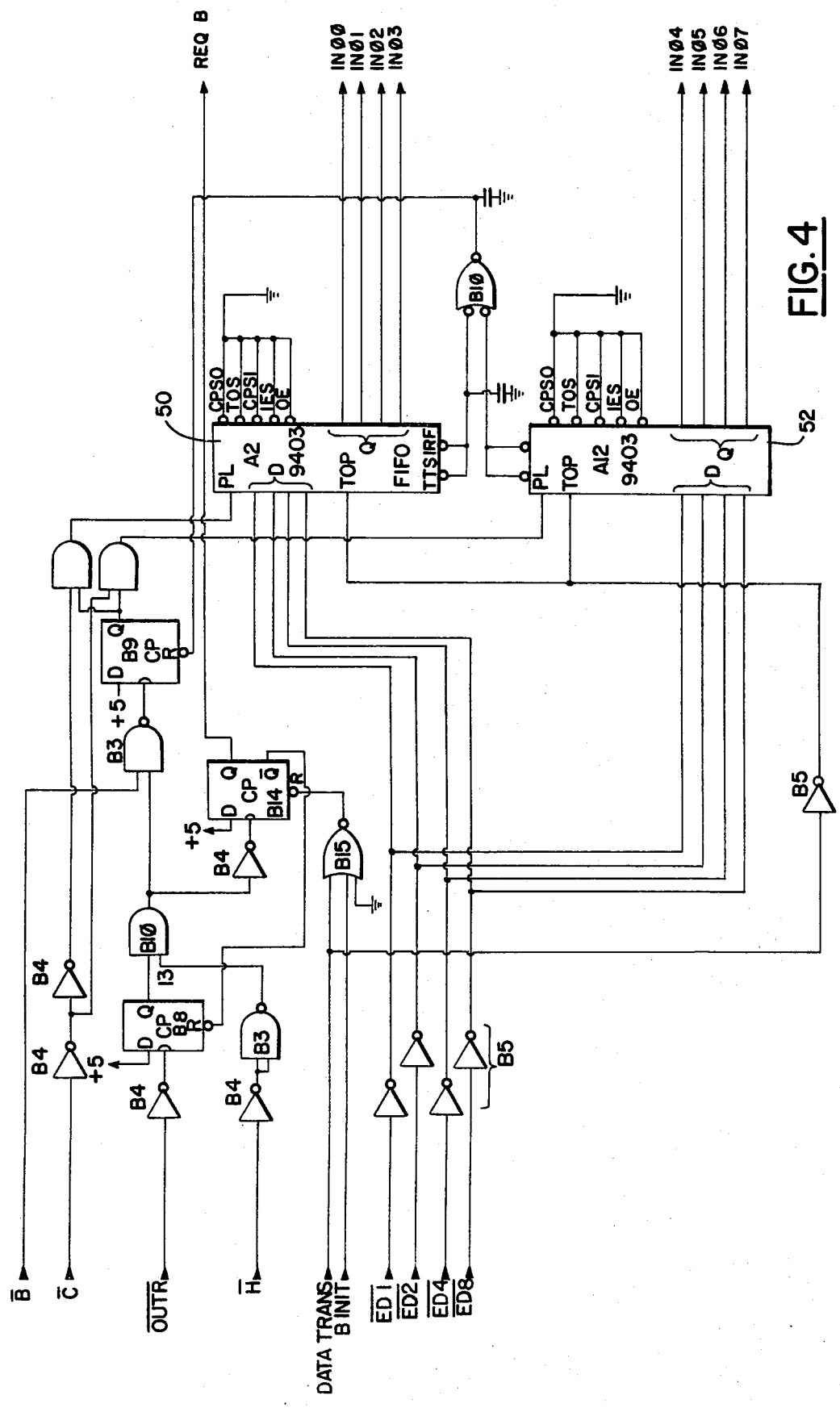
FIG. 4 is a schematic circuit diagram of a portion of the system of the present invention depicted in FIG. 1.

The circuit for the TCR interface 24 is shown in FIG. 4. The four bits of data from the Timing Code reader 26 are supplied to the TCR interface 24 at inputs: $\overline{ED1}$, $\overline{ED2}$, $\overline{ED4}$, and $\overline{ED8}$. The data is from the terminals marked "Data Connector" on the BVG-1000 Timing Code reader 26. The signals to the posts marked: "$\overline{B}$, $\overline{C}$, $\overline{H}$ and $\overline{OUTR}$" are also from the BVG-1000. These signals determine whether the data on the $\overline{ED1}$-$\overline{ED8}$ lines are timing code signals or are user bits signals. The two lines marked "Data Trans" and "B INIT" are connected to the terminals, which are so marked on the DRV-11. The eight parallel bits on the output of the TCR interface 24 are marked: "IN∅∅ . . . IN∅7" and are supplied as the data inputs to the DRV-11. In addition, the signal on the output of the TCR interface 24 marked "REQ B" is connected to the post so named on the DRV-11. The signal on the line REQ B indicates to the DRV-11 that data is ready on the data input lines: IN∅∅ . . . IN∅7.

In operation, the four bits of the timing code are clocked into a first FIFO latch 50 and is stored therein. The next four bits are User's Bits and are clocked into a second FIFO latch 52. The eight bits of data are then simultaneously sent to the computer 14 via the DRV-11 interface 25.

The system 10 is used with an original and untested interaction control program to be combined with a video tape which is a duplicate of the master tape. The material of the master tape would be used and integrated with the control program to create a final video disk, after simulation has proven both materials to be suitable for the mastering process. The speaker 28 and the CRT 30 provide audio and visual feedback to the user of the actual integration of the control program and the video program material. If error is found in either the control program or with the integration of the control program with the programming material it can be corrected prior to the relatively costly process of creating an unalterable video disk. In addition, errors can be detected more readily and since the computer 14 can be used for tracing and controlling the execution of the control programming, an inexpensive error detecting system results. Moreover, enhancements to the control programming supplied on the teletypewriter 12 can be made by the operator through the CRT terminal 16 while the simulation process itself is being conducted. Thus, the present invention offers the capability of testing, correcting and improving upon the control program, and the integration of the control program with the video and audio programming material, prior to the manufacturing of a costly master video disk.

What is claimed is:

1. A system for receiving control information and video information for simulating the operation of a video disk player playing a disk having video information and control information encoded therein, said system comprising:
   video tape player means for receiving said video information and for producing video signals in response thereto, said video signals having a timing code signal associated therewith;
   monitor means for displaying said video signals;
   timing code signal reading means for receiving said timing code signal and for converting said timing code signal into an output signal representative of a count of the number of picture frames incorporated in the video information from a predetermined starting point;
   computer means, communicating with said timing code signal reading means for receiving said output signal; and
   an input device means, communicating with said computer means for supplying said control information to said computer;
   said computer means being connected to said video tape player means for controlling the operation of said video tape player means in response to said control information and said output signal, such that said video signals displayed on said monitor means simulate the operation of a video disk player playing a disk having video information and control information encoded therein, and wherein said computer means includes operator controllable means for amending said control information.

2. The system of claim 1 wherein said timing code signal is LTC or VITC.

3. The system of claim 2 wherein said timing code signal is representative of tape playing time.

4. The system of claim 3 wherein said player means produces an audio signal.

5. The system of claim 4 wherein said input device means is a teletypewriter.

6. The system of claim 5 further comprising:
   a mass storage unit, said unit being connected to said computer 7. A method of simulating the operation of a video disk player playing a disk having video information and control information encoded therein, said method comprising the steps of:
   loading a video tape containing video information in a video tape player means;
   operating said video tape player means with said video tape to produce video signals and a timing code signal associated with said video signals;
   displaying said video signals;
   converting said timing code signal into an output signal representative of a count of the number of picture frames incorporated in the video information from a predetermined starting point; and
   controlling the operation of said video tape player means in response to said output signal and control information and amending said information to cause said displayed video signals to simulate the operation of a video disk player playing a disk having video information and control information encoded therein.

8. A system for simulating the operation of a video disk player playing a disk having video information and control information encoded therein in order to permit an operator to check the control information and the integration of the control information with the video information, prior to the manufacture of the disk; said system comprising:
   video tape player means for receiving externally supplied video information and for producing video signals in response thereto, said video signals having a timing code signal associated therewith;
   monitor means for displaying said video signals;
   timing code signal reading means for receiving said timing code signal and for converting said timing code signal into an output signal representative of a count of the number of picture frames incorporated in the video information from a predetermined starting point;
   computer means, communicating with said timing code signal reading means for receiving said output signal; and
   control information input device means, communicating with said computer means for receiving externally supplied control information and supplying it to said computer;
   said computer means being connected to said video tape player means for controlling the operation of said video tape player means in response to said control information and said output signal, such that said video signals displayed on said monitor means simulate the operation of a video disk player playing a disk having video information and control information encoded therein, and wherein said computer means includes operator controllable means for amending said control information.

9. A method of simulating the operation of a video disk player playing a disk having video information and control information encoded therein, in order to permit an operator to check the control information and the integration of the control information with the video information, prior to the manufacture of the disk, said system comprising the steps of:

loading a video tape containing video information in a video tape player means;

operating said video tape player means with said video tape to produce video signals and a timing code signal associated with said video signals;

displaying said video signals;

converting said timing code signal into an output signal representative of a count of the number of picture frames incorporated in the video information from a predetermined starting point; and controlling the operation of said video tape player means in response to said output signal and control information and amending said information to cause said displayed video signals to simulate the operation of a video disk player playing a disk having video information and control information encoded therein.

* * * * *